(12) United States Patent  
Mecklenburg

(10) Patent No.: US 10,773,827 B2  
(45) Date of Patent: Sep. 15, 2020

(54) GLIDER WINCH/TRUCK COMBINATION AND METHOD OF USE

(71) Applicant: Gregory Bruce Mecklenburg, Bozeman, MT (US)

(72) Inventor: Gregory Bruce Mecklenburg, Bozeman, MT (US)

( * ) Notice: Subject to any disclaimer, the term of this patent is extended or adjusted under 35 U.S.C. 154(b) by 329 days.

(21) Appl. No.: 15/964,282

(22) Filed: Apr. 27, 2018

(65) Prior Publication Data

US 2018/0312275 A1    Nov. 1, 2018

Related U.S. Application Data

(60) Provisional application No. 62/490,717, filed on Apr. 27, 2017.

(51) Int. Cl.
| | | |
|---|---|---|
| *B64F 1/08* | (2006.01) | |
| *B66D 1/48* | (2006.01) | |
| *B64F 1/10* | (2006.01) | |

(52) U.S. Cl.
CPC ............... *B64F 1/08* (2013.01); *B64F 1/10* (2013.01); *B66D 1/485* (2013.01)

(58) Field of Classification Search
CPC ................. B64F 1/04; B64F 1/08; B64F 1/10
See application file for complete search history.

(56) References Cited

FOREIGN PATENT DOCUMENTS

EP     798208 A2 * 10/1997

\* cited by examiner

*Primary Examiner* — Richard G Davis
(74) *Attorney, Agent, or Firm* — Clark & Brody LP

(57) ABSTRACT

A winch/truck and operating method for launching gliders is constructed from a cab and chassis truck which has been modified to utilize truck's power train systems for locomotion of winch machinery. The winch/truck is designed so that truck front faces the launching glider such that truck cab and power controls can be used for operation. The winch/truck can be shifted on the fly from drive mode to winch mode, is completely roadworthy, and can be driven to and from launch site under its own power. The operation method is precisely controlled by using the truck's power control module, GPS, electronic sensing and off the shelf computer technology to display performance parameters and data to the operator.

18 Claims, 7 Drawing Sheets

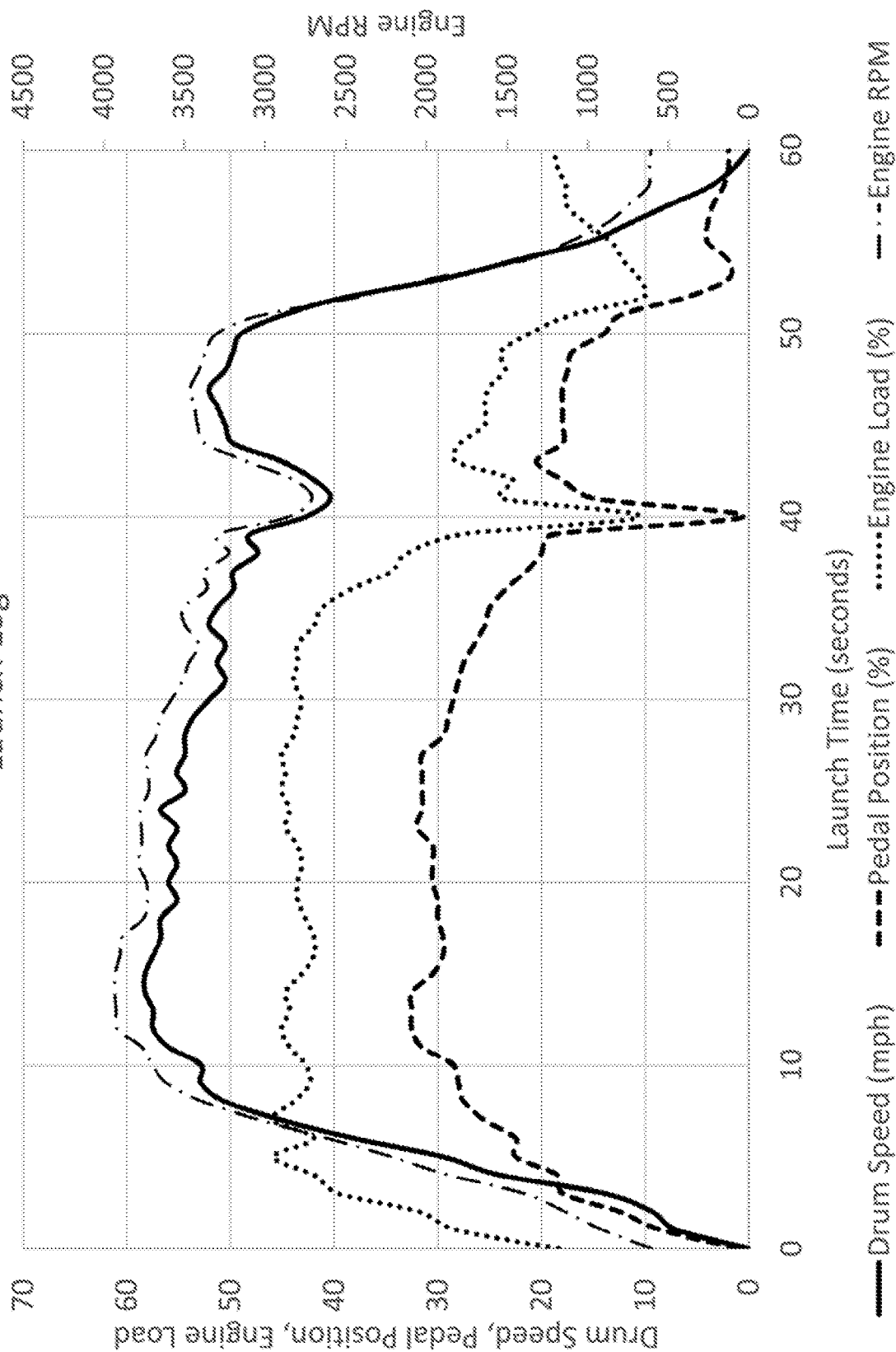

GLIDER WINCH/TRUCK COMBINATION AND METHOD OF USE

This application claims priority under 35 USC 119(e) based on provisional application No. 62/490,717 filed on Apr. 27, 2017 and is incorporated by reference in its entirety.

FIELD OF THE INVENTION

The unpowered aircraft ground launch winch truck is a powerful high speed winch device that is used to launch unpowered aircraft (usually gliders) up to 3,000 feet above ground. The new winch design is an improvement over conventional winches in that it has fewer mechanical components, is much simpler, and is less expensive to build. The winch is also different from conventional winches in that the truck actually faces the launching glider. The method of operation is much improved in that it uses modern automotive and computer technology to improve safety, situational awareness, and launch performance.

BACKGROUND ART

Referring to FIG. 1, for glider winch launch operations represented by 100, the winch is positioned on one end of a runway or field and the glider at the opposite end. Up to 6,000 feet of towline is pulled from the winch drum and towed to the end of the runway where the glider is located. The towline is then attached to the glider via a special tow hook. To launch the glider, the towline is reeled back onto the winch drum at line speeds up to 80 MPH. (Like reeling in a fish with a fishing reel at very high speed). The winch accelerates the glider to flying speed. The glider lifts off and rapidly climbs. The glider can reach altitudes of up to 3,000 feet above ground. At the top of the climb, usually directly above the winch, the glider releases and is free to search for thermals or if training, maneuver and return to the airfield for landing. After the glider releases the towline, the winch operator retracts the remaining towline back to the winch by continuing to wind it onto the drum. The towline has a small parachute on the glider end that prevents it from falling too fast and touching the ground before it is fully retracted. The launch is completed after release of the glider and the towline is fully retracted onto the drum. The process is repeated by towing the glider end of the towline back to the takeoff end of the runway for the next launch.

With reference to FIGS. 2 and 3, the current state of the art glider launch winch 101 is a single purpose machine that is normally constructed on a steel chassis, weighs a minimum of 5,000 pounds, has a high horsepower automotive, truck or crate engine, a three-speed automatic transmission, and a modified automotive rear axle onto which a large cable drum has been bolted in place of one of the normal driven wheels.

The winch drum 103 on current state of the art machines is usually mounted high enough on the chassis so the cable is wound onto the drum at the bottom thru a fairlead/guillotine mechanism (commercially supplied). Most state of the art winches are equipped with a complicated level wind system consisting of a jack screw or some other reciprocating device, a guide tube and rope rollers. The complex level wind system guides the cable or rope onto the drum in uniform layers. A guillotine is used to cut the towline in case of emergency. The current state of the art winch chassis is either built as a dual or single axle heavy trailer requiring a fairly large tow vehicle or is mounted on the back of a one ton truck 105. The current state of the art winch has dedicated fuel, electrical, cooling, exhaust and braking systems and, if mounted on a truck, does not share any of the truck ancillary power train systems. The winch is operated from what is normally a single seat safety cage 107 constructed of steel with a wire mesh safety grate for windshield and side windows and specially designed hand controls for the engine, transmission, and winch drum brake.

The current state of the art winch is controlled by operator feel with no performance input to the operator except for engine rpm and visual sight of the glider pitch and climb angle which are used as an indication of glider climb. Many current winches are underpowered so the operator simply applies full power and lets the glider pilot control the speed and climb rate by raising and lowering the pitch attitude of the glider. In modern times, many winch operations are replacing cable or wire with composite rope, creating other problems with the current winches, specifically structural failures in the drum due to the compression of the rope as it winds onto the drum under tension. On the current state of the art winch, the operator cab/cage usually faces toward the rear of the trailer or truck and the glider is pulled toward the rear of the winch platform. The current state of the art winch machine is mechanically complex and very expensive to build, completely lacks useful performance input to the driver, and can require considerable skill to operate in dynamic launch situations.

SUMMARY OF THE INVENTION

This new winch design is based on a long wheel base, "cab and chassis" truck that has been modified so the truck's computer controlled engine and transmission are used for locomotion of the winch drum. The truck chassis doubles as a chassis for the winch, thus the truck is now a dual purpose machine. The narrow reinforced tow line drum, supplied commercially, is robust enough for modern composite rope. The drum is mounted on an independent final drive differential unit that is attached at the rear of the truck chassis just forward of the drive axle and wheels. A fairlead/guillotine mechanism (pulley box) is located high above the engine compartment of the truck. The fairlead system is far enough from the drum that the towline self-cross-winds in random layers onto the drum while launching, thereby eliminating the need for a complex level wind system.

Use of the truck chassis and its engine, transmission and cab eliminates the need to construct a separate winch chassis and/or to source a separate power-plant and duplicate subsystems including fuel, cooling, exhaust and electrical. In winch mode the winch is operated from the driver's seat of the truck cab. All winch controls are accessible from driver's seat. The truck remains completely roadworthy and is capable of maintaining interstate speeds of up to 80 MPH. It has a trailer hitch so it can tow almost any weight trailer, but would typically be used to transport glider trailers to the launch site. The truck also has a flatbed on the rear of the chassis that is used to transport a four-wheeler as operations support vehicle.

BRIEF DESCRIPTION OF THE DRAWINGS

Embodiments of detailed description will be described with reference to accompanying drawings as follows:

FIG. 7 is an example of a launch log generated from the control module of the glider/winch truck.

DETAILED DESCRIPTION OF THE INVENTION

There are two specific design objectives in connection with the inventive glider/winch truck:

One is to modify an existing cab and chassis truck without compromising truck's roadworthiness to utilize the truck as a chassis and power-plant base for the installation of off-the-shelf computer, mechanical and winch components to build a high performance glider launch winch at much reduced cost compared to the current state of the art glider launch winches.

A second objective is to utilize a power control module, GPS, telemetry, electronic sensing, and off-the-shelf computer hardware to provide input for a precise operator control system that will optimize performance, customize launch profiles for different gliders and pilot abilities, and enhance situational awareness and operational safety.

Figure 1:
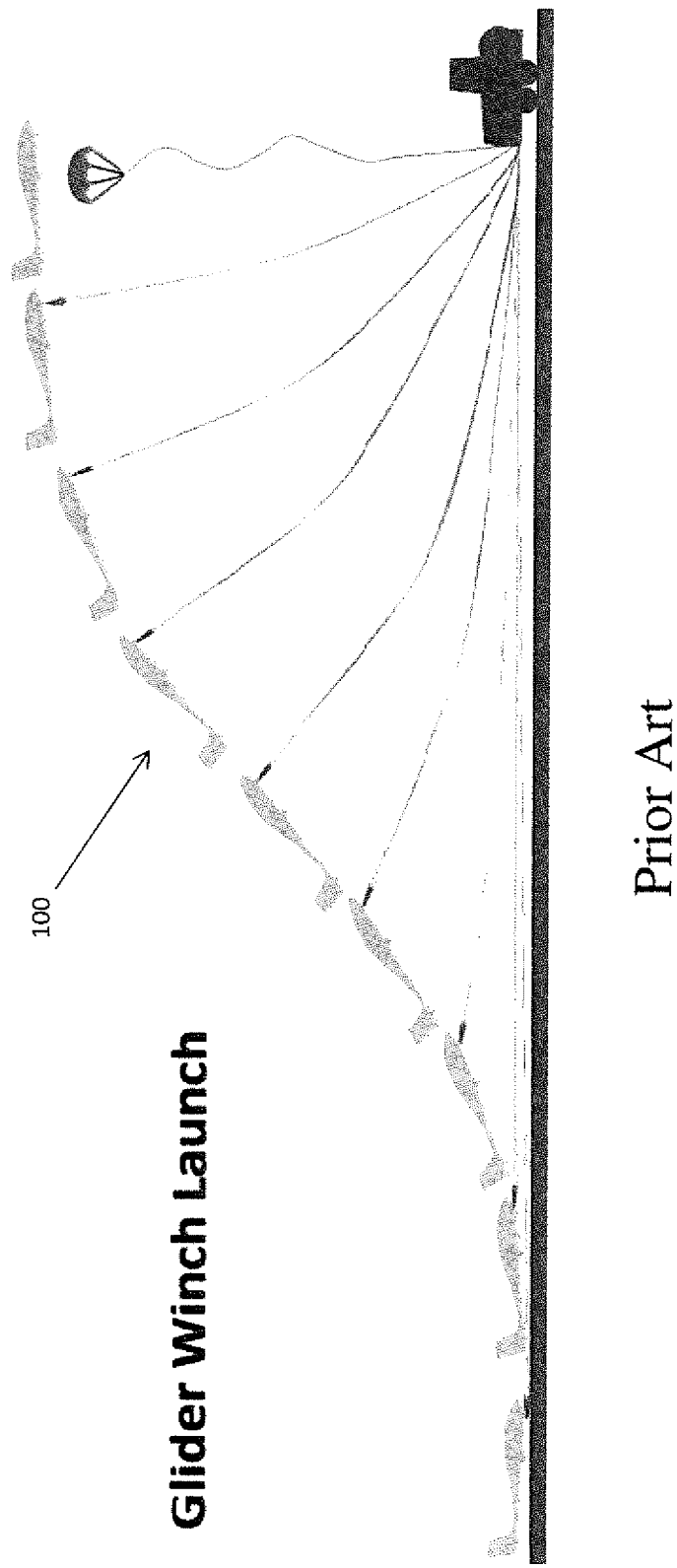
FIG. 1 is an illustration glider winch launch and flight path of the glider.
Figure 2:
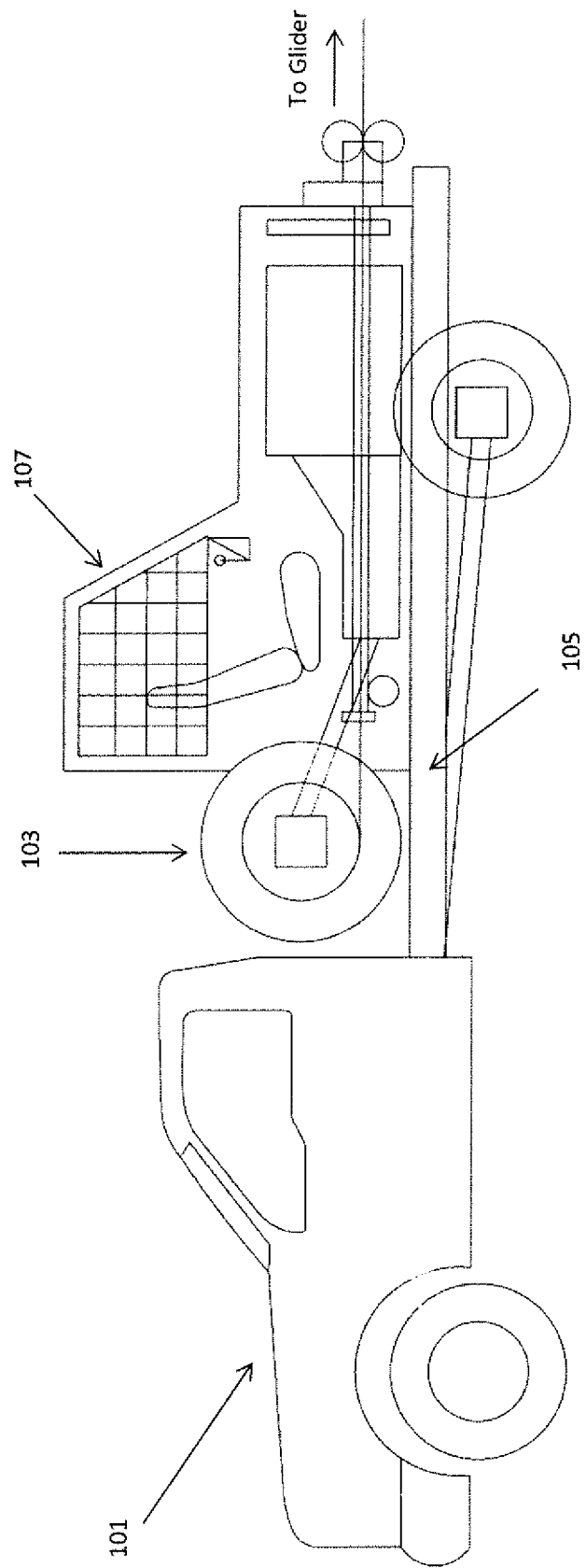
FIG. 2 is a schematic side view of a prior art truck with the winch configuration on the back of a truck.
Figure 3:
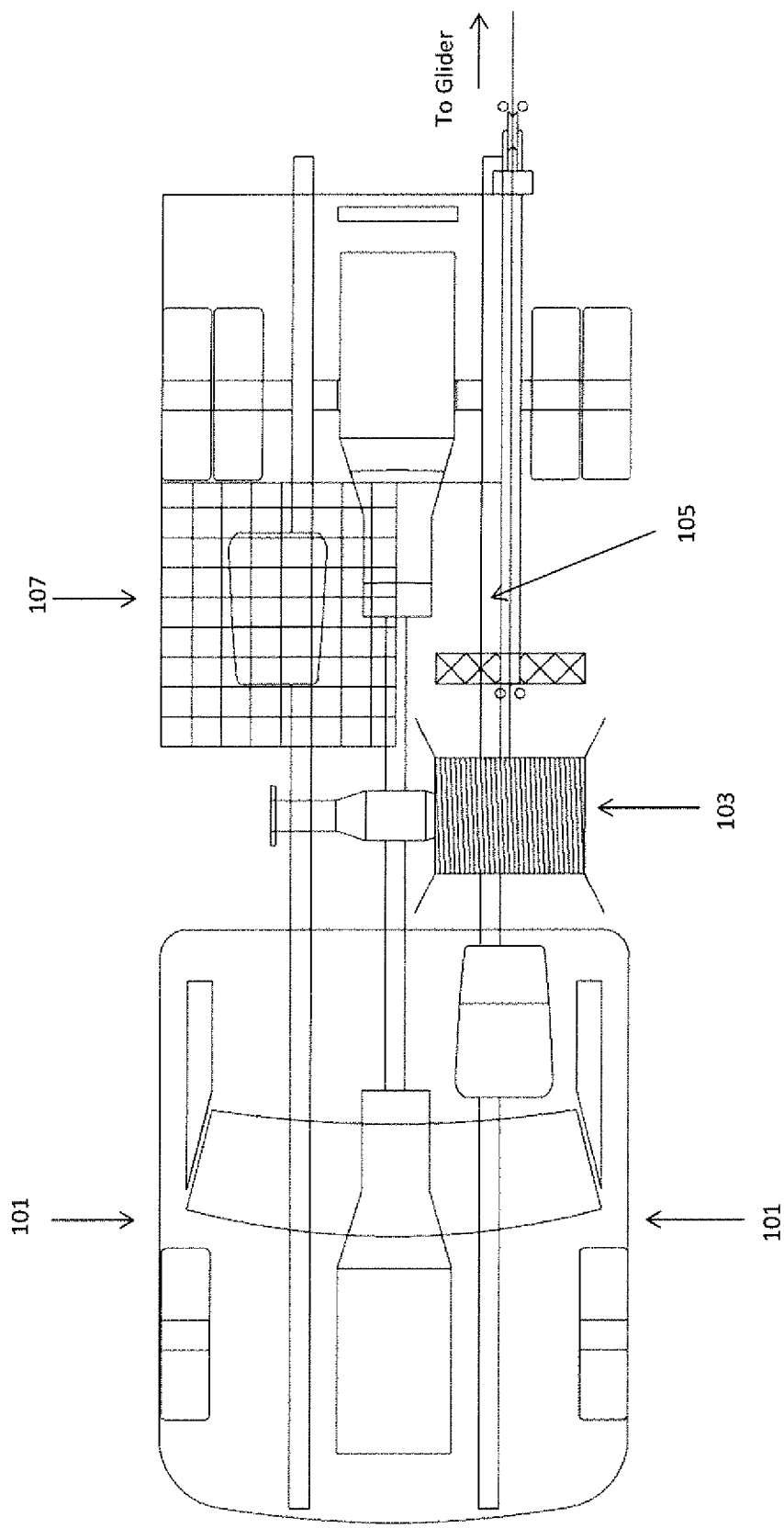
FIG. 3 is a plan view of the truck of FIG. 2, that illustrates the level wind system and its components, the safety cage and the direction of launch that is reverse orientation of new winch design relative to the launching glider.
Figure 4:
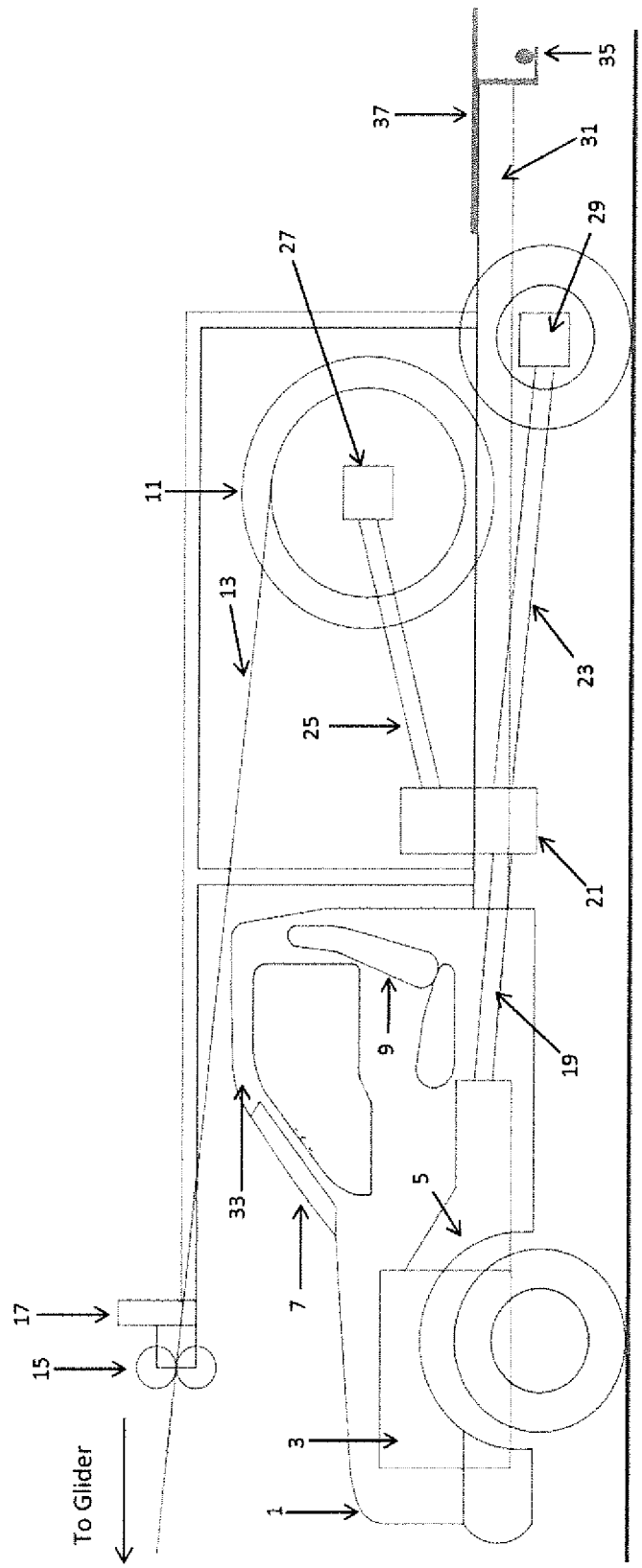
FIG. 4 is a schematic side view of a first embodiment of the inventive glider/winch truck.
Figure 5:
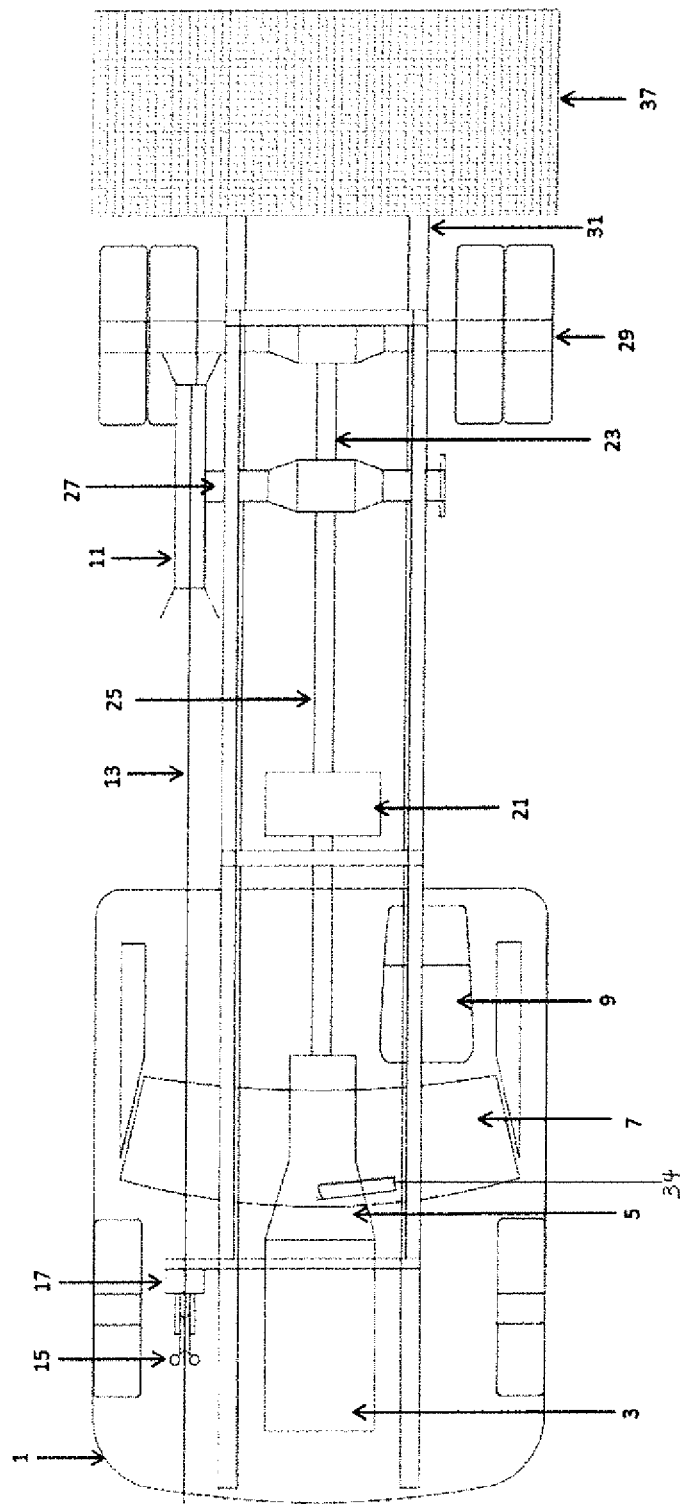
FIG. 5 is a plan view of the truck of FIG. 4, which illustrates position of various components of the new winch system relative to their installed positions on truck.

FIGS. 4 and 5 show one embodiment of the glider winch/truck 1. These drawings show the configuration of the split shaft power take off (PTO) 21, driveline 25, the winch's final drive unit 27, a cable path to the fairlead 15 and guillotine 17 mechanism, operator seat 9, and the location of winch drum 11 on the winch/truck 1. Structurally there is no need for a separate winch chassis because the winch frame is integrated into the chassis of the winch/truck 1.

The split shaft PTO 21, final drive unit 27 and drum 11 are all hard mounted onto the truck chassis 31, thereby eliminating excess weight, structural complexity and expense.

An important element to the new design is the split shaft PTO 21 that is installed in the driveline 23 of the winch/truck 1 behind the transmission 5. The split shaft PTO 21 is a transfer case that accepts full engine 3 power, e.g., 350 HP, and torque delivered thru the winch/truck's transmission 5 into split shaft PTO input shaft 19. Depending on the selected mode, the split shaft PTO 21 directs power flow to either the winch/truck's normal driveline 23 for highway use or to the auxiliary driveline 25 that powers the winch final drive unit 27. The split shaft PTO 21 is controlled via an air actuated solenoid valve. The driver can select either drive mode or winch mode by simply shifting a control lever in the cab 33 while seated in the driver's seat 9.

The split shaft PTO 21 gearing reverses direction of rotation of the driveline 25 in winch mode. If not corrected, the drum 11 would rotate in the wrong direction. To correct this problem, the winch/truck 1 has an upper pinion, reverse rotation differential 2 in the final drive unit 27 that lets the pinion gear drive on the correct side of the ring gear while turning the drum 11 in the correct rotational direction, see FIG. 6. The differential also has a spool 4 in place of the normal automotive spider gears. The spool 4 rotates the winch axles 6 and 8 simultaneously in the same direction.

The rope 13 is wound onto the drum 11 from the top thus making it possible to place the fairlead 15 and guillotine 17 mechanism at the front of the winch/truck.

The modern vehicle is equipped with a computer for engine control called the power control module (PCM). The vehicle's PCM normally receives input from the anti-lock brake (ABS) sensors and ABS computer. Due to the fact the winch/truck 1 is stationary during launch, the winch/truck's rear axle 29 is not turning and therefore does not send vehicle motion data to the PCM. Without that data from a speed sensor, the PCM will not provide proper shift points to the transmission 5, and thus could potentially cause the engine 3 to shut down or go into limp mode, and/or cause other operational difficulties. If this happened during the launch, the launch would fail creating a potentially dangerous scenario for the glider pilot.

Figure 6:
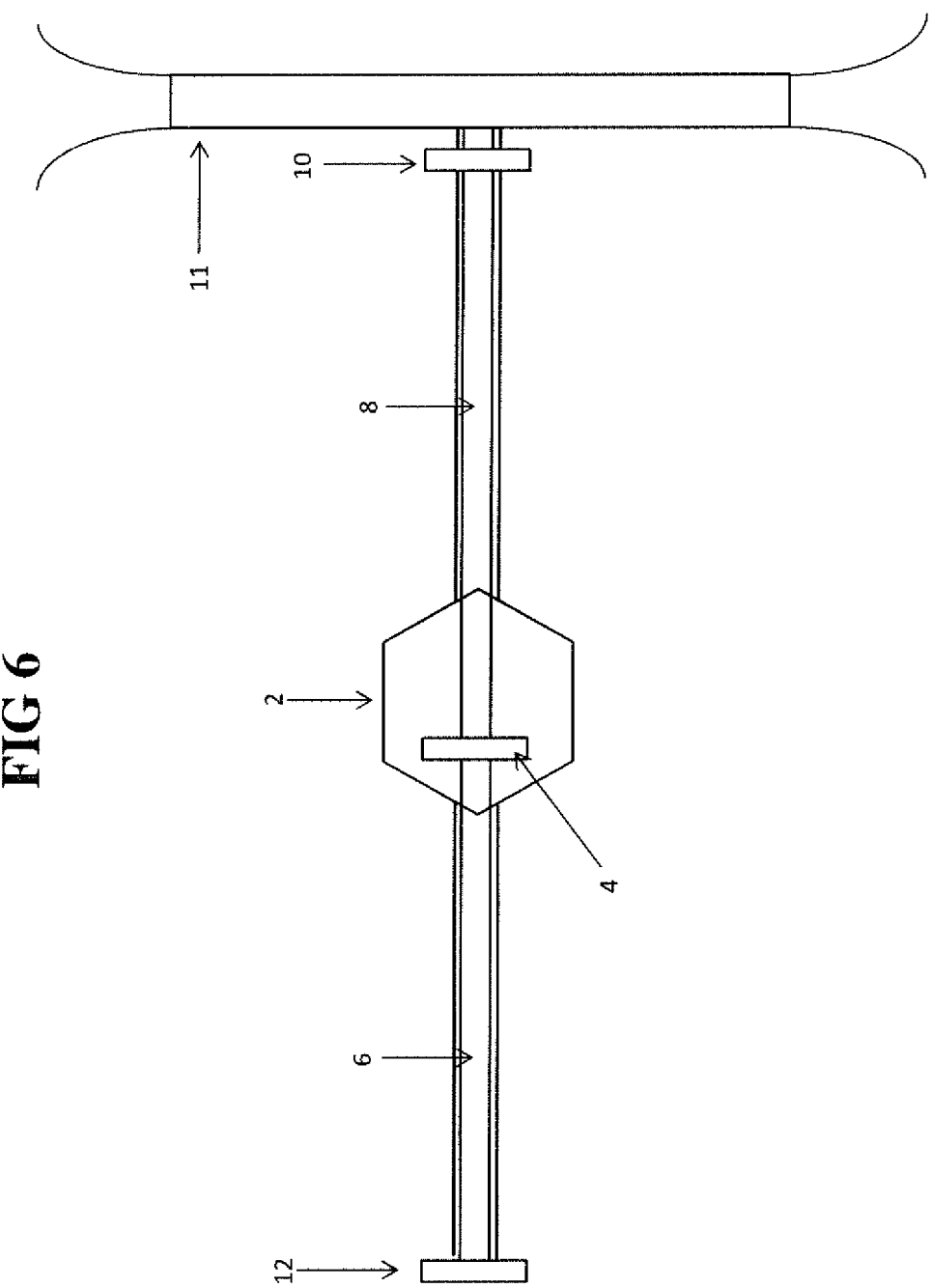
FIG. 6 is a schematic drawing of a final drive unit of the truck of FIGS. 4 and 5, the drawing showing the position of those component of the final drive unit.

To prevent this, an automotive differential tone ring and speed sensor 12, see FIG. 6, is installed on the winch's final drive unit 27. Data from the speed sensor 12 is delivered to the PCM in place of the ABS signal. Input to the PCM is switched from one axle to the other depending on the mode of operation of the winch/truck 1.

The winch final drive unit 29 is fixed on an integrated sub frame which is hard mounted on the truck chassis just forward of the winch/truck's rear axle 29. This allows for pulling the rope 13 over the top of the cab 33, see FIG. 4, which makes it possible for the winch/truck 1 to face the glider being launched. By launching with the winch/truck 1 facing the glider, a separate winch cab is not needed. The winch is operated from the normal driving position in the cab using the winch/truck's conventional foot throttle and transmission controls. A hand operated hydraulic winch drum brake 10 controls drum speed while the rope 13 is being towed out to the glider with a four-wheeler, slows the drum 11 during rope retrieval, and allows the operator to stop the drum 11 from rotating in case of emergency. A guarded air control valve that actuates the guillotine 17 is strategically positioned in the cab 33 to prevent inadvertent actuation. The cab 33 has a heater and air-conditioning for climate control. The cab 33 has two seats. The second seat is used for training another operator or simply for a backup operator who can handle traffic surveillance, radio calls and other communications, observe signals, monitor mechanical systems, and/or operate computer backup systems. This enables the operator to focus completely on the winch launch, again enhancing performance and safety.

To shift the split shaft PTO 21 to drive mode, the operator simply lifts a guarded air actuated solenoid control valve and shifts the split shaft PTO 21 into drive mode. In drive mode, the truck 1 is capable of being driven normally at speeds up to a governed 80 MPH on all public roads. The winch/truck is fitted with a flatbed 37 at the rear of the chassis 31 which is used primarily to haul a four-wheeler that is used to tow rope 13 from winch to the launching glider, and a trailer hitch 39 that is used to tow glider trailers to and from the launch site. The site is usually an airport but due to the self-contained versatility of the winch/truck 1, with minimum crew of three and the site options can be expanded to be a long stretch of road, a dry lake bed or a smooth farmer's field.

A method of operation involving the winch/truck 1 tows the launching glider toward the front of the winch/truck while in winch mode as opposed to the classic method where the glider is towed toward the rear or side of the truck. Due to this new orientation, the winch can now be operated from the driver's seat 9 using normal engine 3 and transmission 5 controls, thereby eliminating the need for a separate operator cab. The cab 33 is very quiet, heated for winter and air conditioned for summer operations. Modern safety glass 7 of the cab 33 improves visibility compared to conventional steel cage design and the use of rope 13 instead of cable further reduces risk to the winch driver and eliminates the need for a separate safety cage. All these features reduce operator fatigue and enhance safety.

The method of operation is also different from current state of the art in that the winch utilizes modern technology to provide the operator with performance input that enhances launch efficiency, situational awareness, and glider climb performance. The winch/truck 1 is equipped with a computer controlled, altitude compensated fuel injected engine 3 and a computer controlled transmission/torque converter 5. The truck's PCM is specifically programmed for winching operations. Drum speed, engine load, throttle position, engine rpm, transmission gear, torque output, and many other performance parameters are read from the winch/truck's PCM and can be selectively displayed in the cab 33, e.g., a display 34, see FIG. 5. The display is at located at correct focal length and is positioned ergonomically in front of the operator so it does not obscure visibility, but is large enough so operator can interpret indications while still focusing on the distant launching glider clearly. The operator can choose a number of performance parameters that can be displayed such as engine RPM, throttle position, towline speed, engine torque, etc. If the glider is equipped with telemetry, the glider airspeed can be displayed in the cab. The operator uses these indications to make precise throttle and transmission 5 adjustments for various glider weights, climb profiles, wind, and glider pilot proficiency to optimize the profile of the launch. The launch parameters can be pre-determined to the match the glider, the pilot's profile preference, pilot ability or the flight instructor's special requests. A throttle stop system prevents the operator from over-powering lighter gliders.

The method of operation is also enhanced by the fact the launch performance parameters can be downloaded from the PCM and GPS for post launch analysis. Winch operators and pilots can use this data to evaluate launches and improve performance and safety in future launches. An example of a launch log that indicates values for various launch parameters is shown in FIG. 7.

Summary of Features of the invention include the following.

1. The winch/truck is a dual purpose machine. It is a glider launch winch and a highway drivable vehicle.
2. A complex level wind system is not needed on the winch as it would be in a classic design making the winch less mechanically complex, easier to build, and more reliable.
3. The winch/truck utilizes a single power system for locomotion of both vehicle and winch thru the installation of a Split Shaft PTO into the drive line of the winch/truck. Winch drive apparatus is fully integrated into winch/truck power system.
4. The winch/truck operator can switch from winch mode to drive mode on the fly from inside the cab.
5. The method of operation is different from classic winching in that the winch/truck faces the launching glider, opposite to the classic design which launches the glider towards the back or side of winch.
6. Due to the change in the method of operation from classic winches, there is no need for a separate winch operator cab or safety cage. The winch is operated from the driver seat in truck cab using normal engine controls from inside the winch/truck cab rather than a separate cab or cage which is normally located at the back of the winch/truck or trailer on a classic winch. The need for a separate winch operator cab is completely eliminated, reducing design complexity and construction costs.
7. Due to use of rope in place of cable or wire for tow line, and due to the use of the winch/truck cab for the operator, and due to modern safety glass in the truck cab, there is no need for a separate steel safety cage to protect the operator.
8. A classic operator cab requires a completely separate set of engine controls, also increasing the complexity of the machine. By eliminating the need for an operator cab, there is no longer a need for separate engine and transmission controls which further reduces the complexity and cost.
9. All winch components are attached and/or integrated onto the truck chassis thereby eliminating the need for a separate chassis. An integrated chassis greatly reduces vehicle weight, complexity and cost.
10. The winch/truck uses existing truck components such as engine and all its subsystems, transmission, radiator and cooling system components, computers, cab safety glass windshield, chassis, heat and air-conditioning systems, alternator and electrical components, and other safety features, eliminating the need to duplicate systems components thereby reducing build time and acquisition costs.
11. For winch control, air and hydraulic controls are easily accessed from the cab. There is no need to exit the winch/truck to shift modes.
12. The winch/truck is completely roadworthy. The winch/truck can be driven at highway speeds while transporting four-wheeler, glider in a trailer and other support equipment.
13. For the method of operation, the winch/truck uses modern automotive electronic engine and transmission computer (PCM), GPS, and telemetry to display selected input to the operator for winch control and situational awareness.
14. For the method of operation, performance data logs are recorded for every launch can be downloaded for review and analysis after launch has been completed.
15. The method of operation for winch control uses operational data retrieved from an on board diagnostics port and telemetry (if glider is equipped) that is displayed thru a computer in truck cab to provide operator with input not previously available in classic winches for precise operator control of drum speed, engine torque, and transmission via conventional foot throttle and conventional controls from inside the comfortable truck cab.
16. The method of operation provides for the downloading of performance logs from the PCM for analysis of performance of launches and increased safety, situational awareness on training of operators.

As such, an invention has been disclosed in terms of preferred embodiments thereof which fulfills each and every one of the objects of the present invention as set forth above and provides a new and improved glider winch/truck combination and method of use.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:
1. A winch system comprising:
a split shaft power take off,
a winch driveline,
a winch final drive unit,
a winch rope drum,
a hydraulic winch drum brake, a computer system for retrieving at least drum speed, engine load, throttle position engine RPM, transmission gear and torque output from a power control module, a fairlead to pay out rope and to guide rope back onto the winch rope drum during winch launch and retrieval of rope onto winch drum, a guillotine to cut rope in case of emergency, a display to provide information obtained from the engine computer to an operator for precise control of the launch, wherein the split shaft power take off connects a transmission output shaft of a truck to either the winch drum through the winch drive line and winch final drive unit, or to a truck drive line.

2. The winch system of claim 1, wherein the computer system uses operational data retrieved from an onboard diagnostics port and telemetry that is displayed using the computer system to provide an operator with input for precise operator control of launch parameters including at least one or more of drum speed, glider speed, engine torque, transmission gear, engine temperature, oil pressure, and engine RPM from inside the truck cab.

3. The winch system of claim 1, wherein the computer system is adapted to generate launch performance logs for display and/or digital storage and/or downloading of launch parameters.

4. The winch system of claim 3, wherein the launch parameters include one or more of drum speed, acceleration percent, engine load, and engine RPM.

5. A winch/truck comprising of:

a truck chassis with a truck cab, a truck power system having an engine, a transmission, a transmission output shaft extending from the transmission, and a truck drive line; and the winch system of claim 1, the winch system integrated into the truck power system;

wherein the fairlead and guillotine are mounted forward on the truck chassis so that the rope pays out forward of the truck cab.

6. The winch/truck of claim 5, wherein the winch system using the computer system is operable from the truck cab.

7. The winch/truck of claim 6, wherein the winch system allows an on the fly operation from the truck cab, the on the fly operation allowing switching between the winch system and winch/truck operation by the operator in the truck cab.

8. The winch/truck of claim 5, wherein the computer system uses operational data retrieved from an onboard diagnostics port and telemetry that is displayed using the computer system to provide an operator with input for precise operator control of launch parameters including at least one or more of drum speed, glider speed, engine torque, transmission gear, engine temperature, oil pressure, and engine RPM from inside the truck cab.

9. The winch/truck of claim 5, wherein the computer system is adapted to generate launch performance logs for display and/or digital storage and/or downloading of launch parameters.

10. The winch/truck system of claim 9, wherein the launch parameters include one or more of drum speed, acceleration percent, engine load, and engine RPM.

11. A method of launching a glider using a winch comprising:

a) providing a glider;

b) providing the winch/truck of claim 5; and c) launching the glider using the winch/truck.

12. The method of claim 11 further comprising controlling at least one or more of drum speed, glider speed, engine torque, transmission gear, engine temperature, oil pressure, and engine RPM using information and data retrieved via an on board diagnostics port and telemetry that is displayed using the computer system of the winch system.

13. The method of claim 11, wherein the winch system is operated from the truck cab by an operator.

14. The method of claim 13, wherein the operator can switch between an operation of the winch system and operation of the truck on the fly from inside the truck cab.

15. The method of claim 11, wherein the computer system uses operational data retrieved from an onboard diagnostics port and telemetry that is displayed using the computer system to provide an operator with input for precise operator control of launch parameters including at least one or more of drum speed, glider speed, engine torque, transmission gear, engine temperature, oil pressure, and engine RPM from inside the truck cab.

16. The method of claim 11, wherein the computer system is adapted to generate launch performance logs for display and/or digital storage and/or downloading of launch parameters.

17. The method of claim 16, wherein the launch parameters include one or more of drum speed, acceleration percent, engine load, and engine RPM.

18. The method of claim 11, wherein an operator in the truck cab faces a glider when starting a glider launch.

* * * * *